United States Patent Office 3,114,104
Patented Dec. 10, 1963

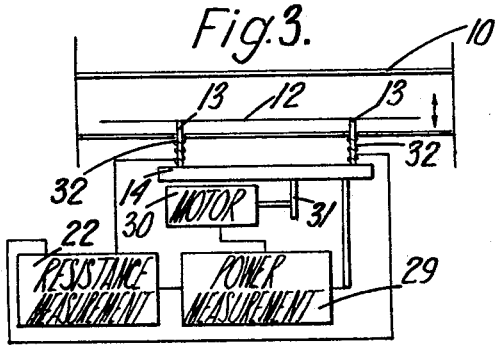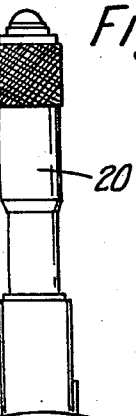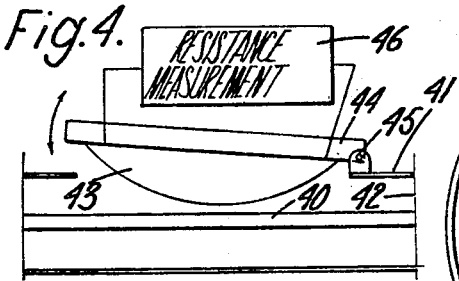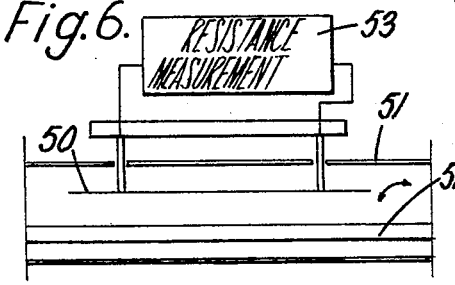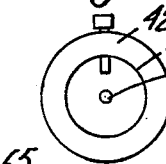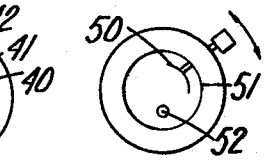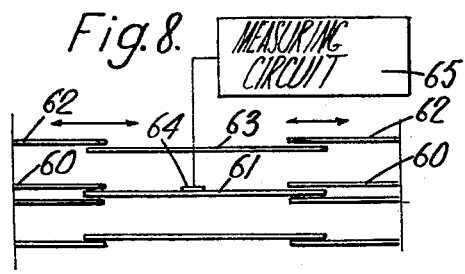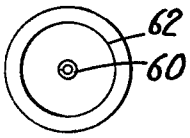
INVENTOR
Bernard Fleming
By
Watson, Cole, Grindle & Watson
ATTORNEYS

3,114,104
MICROWAVE POWER DETERMINING APPARATUS USING A RESISTIVE VANE WITH ELECTRICAL CONNECTIONS THEREON FOR RESISTIVE MEASUREMENT OF THE VANE
Bernard Fleming, 133 Munster Road,
Teddington, England
Filed Jan. 12, 1959, Ser. No. 786,423
3 Claims. (Cl. 324—95)

This invention relates to microwave measuring and control apparatus and has for its principal object to provide an improved form of apparatus for measuring or controlling the transmission of power in a microwave transmission system.

According to this invention, microwave measuring or control apparatus comprises a transmission line arranged to transmit microwave energy, a dissipative sensing element in the microwave field of said line, calibrated adjustment means for moving said element with respect to the microwave field so that the effective field strength at the element is altered and indicating or control means responsive to temperature changes of said element. The sensing element might be formed of lossy dielectric material but conveniently is formed of resistive material, for example a resistive vane. When microwave energy is transmitted along the line, some or all of it will be absorbed and dissipated in the dissipative sensing element and will thus raise the temperature of that element. The element may be made such that, when it is in the maximum electric field, practically all the power is absorbed or it may be arranged to absorb only a proportion of that power. If the sensing element is moved from this position towards the region where the electric vector is zero, the power absorbed will be reduced and the proportion of the power absorbed will depend solely on the positioning of the sensing element. The adjustment means may thus be calibrated in power ratio indicating the proportion of the incident power which is absorbed. If it is required to measure the power, the temperature rise of the sensing element can be measured electrically, for example by means of a thermocouple adjacent the element or, in the case of a resistive sensing element by measuring the resistance of the element, and hence the power absorbed in the element can be determined. Knowing the power absorbed and the proportion this is of the total power being transmitted by the transmission line, this total power can be calculated.

If it is required to control the power passing along the line, the aforementioned means responsive to temperature changes of said element may be arranged to control a servo-motor for moving said sensing element in accordance with the incident transmitted power, determined from the temperature change and position of the element, so that the element absorbs any power over a pre-determined value whereby the transmitted power passing said element remains constant despite variations in the incident power.

The aforementioned transmission line may comprise a waveguide or a coaxial line or slab line.

If a waveguide is employed, conveniently the waveguide is of rectangular section and arranged to transmit said microwave energy as a transverse electric wave in the $H_{01}$ mode. With such a waveguide, conveniently the sensing element comprises a vane formed of or coated with resistive material. This vane may be arranged in a guide in a plane parallel to the axis of the guide and parallel to the electric vector.

In another arrangement a waveguide of circular section is arranged to transmit said microwave energy as a transverse electric wave in the $H_{01}$ mode and in this case conveniently said sensing element comprises a vane formed of or coated with resistive material arranged in a diametral plane and rotatable about the axis of the guide.

For a coaxial transmission line, a vane formed of or coated with resistive material may be arranged in a radial plane and made movable in its own plane towards or away from the axis of the line or the inner conductor may be made eccentric with respect to the outer conductor and a vane of arcuate section and concentric with the axis of the outer conductor may be made rotatable about that axis or there may be provided a telescopic section of the coaxial line with the sensing element comprising a portion of the inner conductor formed of or coated with resistive material and adapted to telescope into an adjacent portion or portions of the inner conductor whereby the length of the sensing element exposed to the electric field can be varied.

In the case of a slab line with an inner conductor between two parallel conductive plates, conveniently said sensing element comprises vanes formed of or coated with resistive material in an axial plane normal to the planes of said plates and movable normal to their own plane.

The invention is particularly applicable to microwave power measuring apparatus and according to one aspect of the invention microwave power measuring apparatus comprises a waveguide adapted to transmit the power to be measured as a transverse electric wave in the $H_{01}$ mode, a vane formed of or coated with resistive material having a resistance which varies with temperature over an operating range, which vane is arranged in the waveguide in a plane parallel to the axis of the guide and parallel to the electric vector, calibrated adjusting means for moving said vane across the guide in a direction normal to its plane and means for effecting electrical connections to axially spaced points on the vane. When microwave power is transmitted through the waveguide, some or all of this power will be absorbed and dissipated in the resistive material of the vane thus raising the temperature of that material. The vane may be made such that when it is in the maximum electric field, that is to say in the centre of the guide if the latter is rectangular, practically all the power is absorbed or it may be arranged to absorb only a known proportion of the power. If the vane is moved from this position towards the region of the wave guide where the electric vector is zero, the power absorbed will be reduced and the proportion of the power absorbed will depend solely on the positioning of the vane. The adjusting means may thus be calibrated in power ratio (or decibels) indicating the proportion of the incident power which is absorbed. The temperature rise of the vane can be measured electrically by measuring its resistance and hence the power absorbed in the vane can be determined. Knowing the power absorbed and the proportion this is of the total power being transmitted by the waveguide, this total power can thus be calculated. The power absorbed by the vane for any given resistance value of the vane may most conveniently be determined by calibration using a direct current power supply source. Generally, the most convenient way of using the instrument is to move the vane across the guide so as to balance the resistance of the vane against a known resistance, for example using a bridge circuit, and in this case, knowing the power absorbed in the vane when the system is balanced, the power transmitted may be derived directly from the setting of the vane. Different ranges of measurement may, however, be obtained by balancing at different levels, for instance in steps corresponding to multiples of 10. An ambient temperature change compensating element could be included in the resistance measuring circuit to compensate for external temperature changes. The adjusting means for moving the vane across the guide may be accurately calibrated using a standard attenuator since it is readily possible to make microwave attenuators of a high degree of accuracy. The equation which relates the fraction of the incident power that is absorbed to the calibration (in db) of the adjusting means is as follows:

$$P_I = P_A \cdot \frac{\text{antilog} \frac{\alpha}{10}}{1 - \text{antilog} \frac{\alpha}{10}}$$

where $P_I$ is the incident power
$P_A$ is the power absorbed at the working level (indicated by the bridge)
$\alpha$ is the attenuation due to the vane.

The calibration may be effected by connecting the attenuator in the input to the power measuring apparatus and noting the adjustment necessary to the position of the vane required to bring the power absorbed to a datum level as the power input is gradually increased.

It will be appreciated that the instrument can measure power while only absorbing a very small fraction of the power and hence may be used for continuous monitoring of power being transmitted through a waveguide.

The following is a description of a number of embodiments of the invention, reference being made to the accompanying drawings in which:

FIGURE 2 is an end elevation of the apparatus of FIGURE 1;

FIGURE 3 is a diagrammatic side elevation of a microwave power control apparatus having a rectangular guide with a transversely movable vane;

FIGURE 4 is a diagrammatic sectional elevation of power measuring apparatus having a coaxial line with a pivoted vane;

FIGURE 5 is an end view of the apparatus of FIGURE 4;

FIGURE 6 is a diagrammatic sectional elevation of power measuring apparatus having an asymmetrical coaxial line with a rotatable vane;

FIGURE 7 is an end elevation of the apparatus of FIGURE 6;

FIGURE 8 is a diagrammatic sectional elevation of power measuring apparatus having a telescopic coaxial line;

FIGURE 9 is an end elevation of the apparatus of FIGURE 8;

Figure 1:
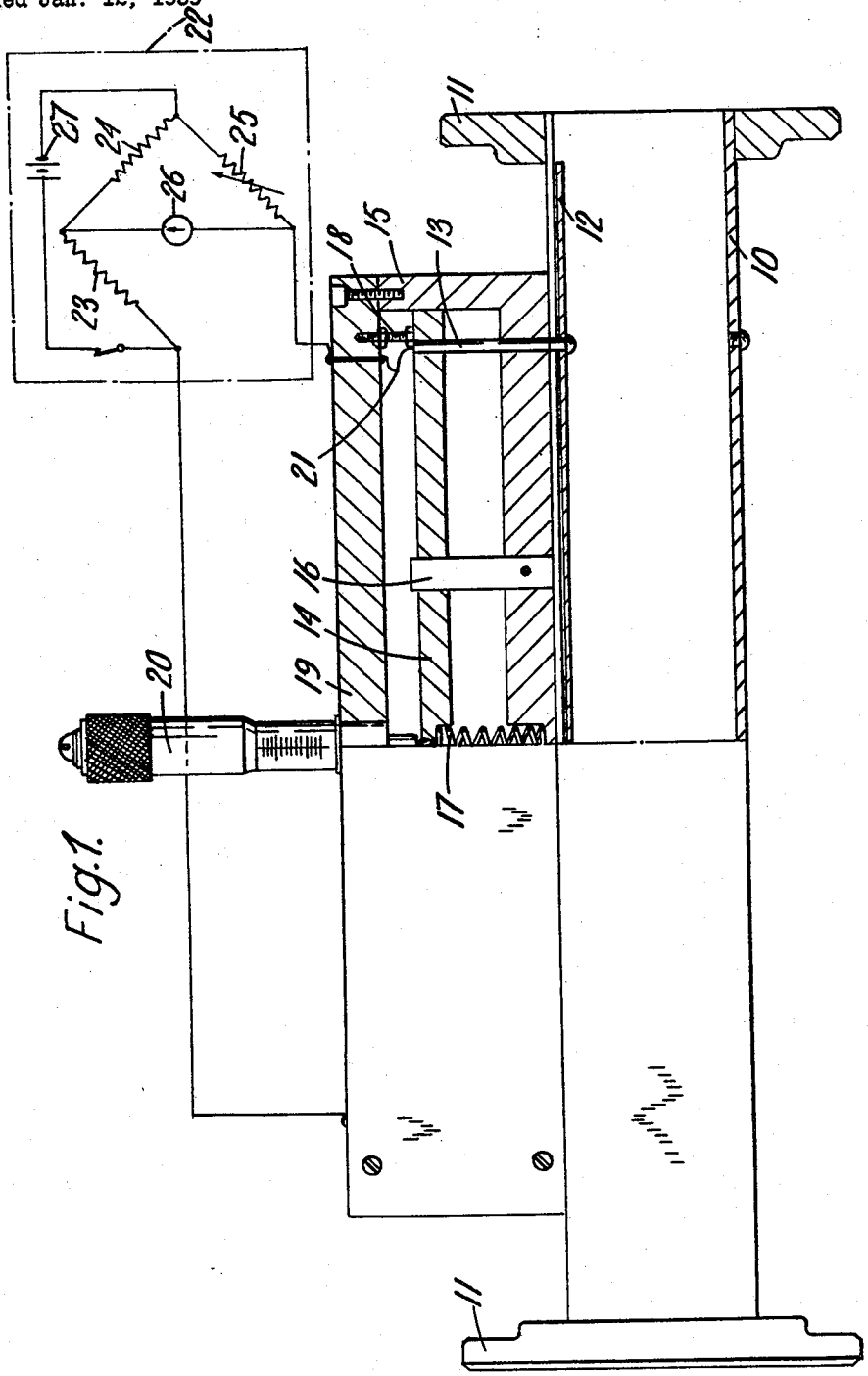
FIGURE 1 is a half-sectional elevation of one construction of microwave power measuring apparatus.

Referring to FIGURES 1 and 2 there is shown power measuring apparatus comprising a length of rectangular waveguide 10 with coupling flanges 11 at its ends. Mounted in the guide 10 is a vane 12 which is formed of or coated with resistive material. For example, it might be formed of dielectric material with a platinum coating. To ensure good matching, the vane may be made an elongated diamond shape or of rectangular form with tapered ends. This vane lies in a plane parallel to the shorter sides of the rectangular waveguide, that is to say parallel to the electric vector, and is also parallel to the axis of the waveguide. It is mounted on two rods 13 which form electrical connections to the resistive film. These rods extend through suitable bores in the shorter sides of the waveguide 10 and are secured to a movable block 14 which is slidable towards and away from the waveguide within a housing 15, the block having apertures engaging and sliding on guide members 16 to ensure that the block 14 always remains parallel to the side of the waveguide. A helical spring 17 is provided urging the support member 14 away from the waveguide and adjustable stops 18 are provided to limit the travel of the block 14 in the outward direction. The stops 18 are formed by bolts in a cover plate 19 on the housing 15 and are adjusted so that the vane 12 can be brought closely adjacent one side of the waveguide. Calibrated adjustment means shown as a micrometer 20 are provided for moving the support 14 inwardly thereby moving the vane 12 into the waveguide. The system is arranged so that the vane may be moved between a position adjacent one side of the waveguide 10 (where the electric vector is Electrical connections from the resistive material of the vane 10 are taken via the rods 13 and flexible wires 21 to an external measuring unit 22. The points of connection of the measuring circuit to the vane are spaced axially; their position is not critical but, if necessary, the optimum positions may be determined empirically for any particular application of the apparatus. The measuring unit 22 in its simplest form comprises three resistors 23, 24 and 25, which, with the resistive vane 12 form a Wheatstone bridge circuit energised from a direct supply source indicated diagrammatically at 27 and provided with a null-balance detector 26.

As previously explained, the relationship between the of the waveguide 10 it will absorb all or a known proportion of the power. If the vane 12 is moved towards the side of the waveguide and the centre of the waveguide. zero) the power absorbed will be reduced and the proportion of the power absorbed will depend solely on the positioning of the vane 12. The temperature rise of the vane can be measured electrically by measuring its resistance with the unit 22 and hence the power absorbed can be determined. Knowing the power absorbed and the proportion which this is of the total power being transmitted, the total power can be calculated. The power absorbed by the vane 12 for any given resistance value of the vane may conveniently be determined by calibration using a direct current power supply source, a known power being fed into the vane through the rods 13 and the resistance of the vane measured using the measuring apparatus 22. To ensure that the temperature rise of the vane is accurately representative of the power absorbed, the vane as far as possible, is thermally insulated from the remainder of the apparatus.

Generally the most convenient way of using the instrument is by operating the micrometer adjustment 20 to move the vane 12 across the guide 10 so as to balance the resistance and since the resistance depends on the Knowing the power absorbed in the vane when the system is balanced, the power transmitted may be derived directly from the reading of the micrometer 20. For this purpose interchangeable fixed standard resistances may be used in the Wheatstone bridge circuit. A series of such fixed standards may be employed with switch means for selectively switching the appropriate standard into circuit so as to provide for a number of different ranges of measurement. Alternatively an adjustable standard 25 as shown in FIGURE 1 may be employed. If desired an ambient temperature compensation circuit may be incorporated in the measuring apparatus 22 to compensate for external temperature changes.

As previously explained, if the vane 12 is in the centre calibration of the micrometer 20 and the position of the vane may be determined by using a standard attenuator. The attenuator may be connected in the input to the power measuring apparatus and, as the attenuator is adjusted with constant power input to the attenuator and, as the attenuator setting is altered, there is noted the adjustment to the position of the vane 10 which it is necessary to make to keep the power absorbed at a datum level.

Since the attenuation effected by the vane depends on the resistance of the vane against a known resistance. temperature, the attenuation can be adjusted by passing a direct current through the vane. If the direct current power greatly exceeds the microwave power absorbed, the apparatus can be used as a variable attenuator controllable by a direct control current.

Instead of connecting the resistance measuring circuit 22 directly to the vane, the resistance of the latter might be measured by means of a measuring circuit electromagnetically coupled to the vane.

It will be appreciated that the apparatus of FIGURES 1 and 2 may be used for measuring power whilst absorbing only a very small fraction of the transmitted power. It may thus be used for continuous monitoring of the power transmitted through a waveguide. Because the attenuation is so very small, the apparatus of FIGURES 1 and 2 can be made substantially frequency insensitive and can be used over a wide frequency band.

As shown in FIGURE 3, the arrangement of FIGURES 1 and 2 may be modified so as to form a control system for controlling the power transmitted along a transmission line. In FIGURE 3, for clarity, the apparatus is illustrated only diagrammatically and it will be seen that, as in the arrangement of FIGURES 1 and 2, there is a rectangular section waveguide 10 having a movable vane 12 lying in a plane parallel to the narrower faces of the waveguide, this vane being carried on a support 14 by rods 13. It will be understood that suitable guides may be provided, similar to those of FIGURES 1 and 2 for ensuring that the vane 12 always remains parallel to the narrower face of the waveguide. The resistance measuring unit 22 is connected to the vane 12 but, in the arrangement of FIGURE 3 the output of this unit is fed to a power measuring unit 29 which determines the incident power in the waveguide 10 from the output of the unit 22 and from the position of the vane 12. The power measuring unit 29 controls an electric motor 30 which effects movement of the vane 12 by means of a cam 31 arranged to push the support 14 towards the waveguide against the action of helical compression springs 32. It will readily be appreciated that the arrangement of FIGURE 3 may be utilised to control the power transmitted through the waveguide 10 in accordance with any required law, the power measurement unit 29 being arranged to position the vane to absorb any excess power over that required to be transmitted.

It will be appreciated that the power control arrangement of FIGURE 3 is basically the power measuring system of FIGURES 1 and 2 with the addition of a suitable servo-motor for positioning the vane. In the following, there will be described a number of other forms of power measuring systems and these may all be utilised as power control systems in a similar way. No further specific description will, therefore, be given of the use of these various other power measurement systems for control of power as distinct from measurement.

Referring to FIGURES 4 and 5 there is shown a coaxial line comprising an inner conductor 40 and an outer conductor 41. For convenience the power measuring section is made as a section of line with coupling flanges 42 at its ends. A sensing element 43, in the form of a vane made of or coated with resistive material is mounted on a support 44 pivotally connected at 45 to the outer conductor of the coaxial line so that the vane 43 is movable towards and away from the inner conductor 40 in a radial plane. A resistance measurement unit 46 is connected to two points on the vane 43 for measuring the resistance of the vane. It will be apparent that the amount of power absorbed by the vane 43 will depend on its depth of insertion into the coaxial line and hence, with the use of calibrated adjusting means for measuring the position of the vane, the arrangement of FIGURES 4 and 5 may be employed in a manner analogous to that employed in the arrangement of FIGURES 1 and 2 for the measurement of the power transmitted along the line.

FIGURES 6 and 7 illustrate another arrangement for measuring power in a coaxial line. In this arrangement there is provided a vane 50 of arcuate form in section which is rotatable around the centre of the outer conductor 51, calibrated adjusting means (not shown) being provided for determining the angular position of the vane. The inner conductor 52 of the coaxial line is eccentric with respect to the outer conductor so that the movement of the vane changes the effective position of the vane with respect to the electric vectors. A resistance measuring unit 53 is connected to the vane for measuring the resistance thereto and the system may thus be used for power measurement in a manner analogous with the method employed for FIGURES 1 and 2.

FIGURES 8 and 9 illustrate yet another arrangement for measuring the power transmitted along a coaxial transmisson line. In FIGURES 8 and 9 there is provided a telescopic section of transmission line, the inner conductor comprising two cylindrical end pieces 60 within which a resistive sensing element 61 of rod-like form is slidable. The end portions have outer conductors 62 within which an outer conductor 63 of the centre portion is slidable. It will thus be seen that the end portions may be moved axially with respect to the centre portion. The power absorbed by the centre portion will depend on the length of the inner conductor 61 which is exposed. The power absorbed could be measured by measuring the resistance of the centre portion 61 of the inner conductor but in FIGURES 8 and 9 there is illustrated diagrammatically a thermocouple 64 attached to the inner conductor 61 which thermocouple is connected to a measuring circuit 65 which serves to measure the thermocouple output and hence to measure the temperature of the element 61. This temperature depends on the power absorbed and the arrangement may thus again be used in a manner analogous to the arrangement of FIGURES 1 and 2 for measuring the power transmitted along the coaxial line. It will immediately be apparent that a thermocouple such as the thermocouple 64 might be used instead of a resistance measuring circuit in the arrangements of FIGURES 1 to 7.

Figure 10:
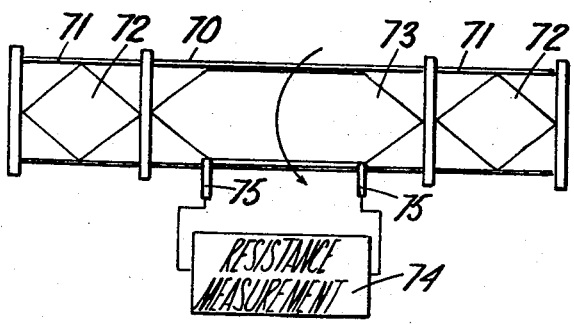
FIGURE 10 is a diagrammatic sectional plan view of power measuring apparatus using a circular waveguide with a rotatable vane.
Figure 11:
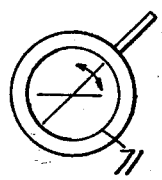
FIGURE 11 is an end elevation of the apparatus of FIGURE 10 with the rotatable vane in a different position from that shown in FIGURE 10.

FIGURES 10 and 11 illustrate an embodiment of the invention for measuring the power transmitted through a cylindrical waveguide. This waveguide is arranged to transmit power in the $H_{01}$ mode and the measuring unit comprises a length of circular waveguide 70 with two end portions 71. Each of the end portions 71 contains a fixed vane 72 made of conductive material which is oriented at right angles to the required plane of polarisation to ensure that only signals of the required plane of polarisation of the signals enter or leave the section 70 of circular waveguide. The section 70 contains a resistive vane 73 and is coupled to the end portion 71 by rotatable couplings for rotation about the axis of the guide, calibrated adjustment means (not shown) being provided for measuring the angular position of the section 70. A resistance measurement circuit 74 is connected to the vane by connecting rods 75 which extend through the wall of the guide 70. As the section 70 is rotated, the plane of the vane 73 with respect to the electric vector alters and hence the amount of power absorbed will alter. The system may thus be used in the manner analogous to the arrangement of FIGURES 1 and 2 for measuring the power transmitted through the waveguide.

Figure 12:
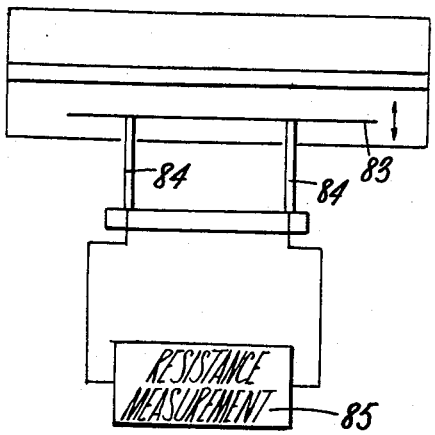
FIGURE 12 is a diagrammatic sectional elevation of power measuring apparatus using a slab line with a transversely movable vane.
Figure 13:
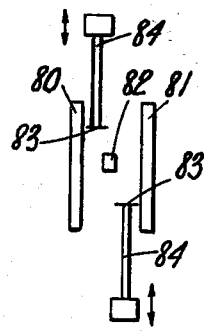
FIGURE 13 is an end elevation of the apparatus of FIGURE 12.

FIGURES 12 and 13 illustrate an arrangement for measuring the power transmitted through a slab line. The slab line consists of two conductive plates 80, 81 with a centrally disposed inner conductor 82. Sensing elements in the form of resistive vanes 83 are mounted on support rods 84 for movement parallel to the plates 80, 81, the vanes lying in a plane parallel to the axis of the line and at right angles to the plates 80, 81. Two vanes are employed to make the arrangement symmetrical and the vanes are interconnected to a resistance measurement circuit 85 for measuring the resistance of the vanes. This resistance depends on the power absorbed and hence the system may be used in a manner analogous to the arrangement of FIGURES 1 and 2 for measuring the power transmitted through the slab line.

I claim:

1. Microwave power determining apparatus comprising a waveguide of rectangular section arranged to transmit microwave energy as a transverse electric wave in the $H_{01}$ mode, a resistive vane movably mounted in said waveguide, the vane being arranged in a plane parallel to the electric vector and parallel to the axis of the waveguide and movable across said guide in a direction transverse to said electric vector, calibrated adjusting means for moving said vane, electrical resistance measuring means electrically connected to spaced points on said vane to produce an electrical output signal representative of the resistance of said vane, and means responsive to said output signal.

2. Microwave power determining apparatus comprising a transmission line arranged to transmit microwave energy, a resistive element in the microwave field in said line, having a resistance which varies with temperature, calibrated adjusting means for moving said element with respect to the microwave field so that the effective field strength at the element is altered and electrical resistance determining means connected to spaced points on said element.

3. Microwave power measuring apparatus comprising a waveguide adapted to transmit the power to be measured as a transverse electric wave in the $H_{01}$ mode, a resistive vane having a resistance which varies with temperature over an operating range, which vane is arranged in the waveguide in a plane parallel to the axis of the guide and parallel to the electric vector, calibrated adjusting means for moving said vane across the guide in a direction normal to its plane, means for effecting electrical connections to axially spaced points on the vane, and electrical resistance measuring equipment connected to said axially spaced points on the vane.

References Cited in the file of this patent

UNITED STATES PATENTS

| | | |
|---|---|---|
| 2,429,200 | Bradley | Oct. 21, 1947 |
| 2,496,541 | Johnson | Feb. 7, 1950 |
| 2,496,879 | Lafferty | Feb. 7, 1950 |
| 2,497,094 | Moreno | Feb. 14, 1950 |
| 2,510,613 | Weber | June 6, 1950 |
| 2,515,228 | Hupcey | July 18, 1950 |
| 2,613,251 | Ebert | Oct. 7, 1952 |
| 2,707,270 | Stahl | Apr. 26, 1955 |
| 2,718,580 | Shirley | Sept. 20, 1955 |
| 2,731,603 | Weber | Jan. 17, 1956 |
| 2,748,353 | Hogan | May 29, 1956 |
| 2,870,389 | Fraser | Jan. 20, 1959 |
| 2,933,684 | Selby | Apr. 19, 1960 |

FOREIGN PATENTS

| | | |
|---|---|---|
| 691,939 | Great Britain | May 27, 1953 |

OTHER REFERENCES

Gaffney: Microwave Measurements and Test Equipments, Proceedings of the I.R.E., October 1946, pages 775–784.

Montgomery: Technique of Microwave Measurements, vol 11, M.I.T. Radiation Laboratory Series, copyright 1947; McGraw-Hill Book Company, Inc., New York, pages 748–751.